United States Patent
Saxena (10) Patent No.: US 8,468,234 B1
(45) Date of Patent: Jun. 18, 2013

(54) METHODS AND SYSTEMS FOR TRACKING FILE ROUTING ON A NETWORK

(75) Inventor: Tushar Saxena, Lexington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 1574 days.

(21) Appl. No.: 10/803,508

(22) Filed: Mar. 18, 2004

Related U.S. Application Data (60) Provisional application No. 60/463,274, filed on Apr. 16, 2003.

(51) Int. Cl.
G06F 15/173 (2006.01)

(52) U.S. Cl.
USPC .......................................... 709/224

(58) Field of Classification Search
USPC .......................................... 709/224
See application file for complete search history.

(56) References Cited

U.S. PATENT DOCUMENTS

| | | | |
|---|---|---|---|
| 4,217,659 A * | 8/1980 | Glenn, Jr. | 367/35 |
| 6,057,892 A | 5/2000 | Borer | |
| 6,279,113 B1 | 8/2001 | Vaidya | |
| 6,684,247 B1 * | 1/2004 | Santos et al. | 709/224 |
| 2002/0032871 A1 * | 3/2002 | Malan et al. | 713/201 |
| 2004/0111632 A1 * | 6/2004 | Halperin | 713/200 |
| 2004/0114519 A1 * | 6/2004 | MacIsaac | 370/232 |

* cited by examiner

Primary Examiner — Kevin Bates
Assistant Examiner — Kevin Mai (57) ABSTRACT

Disclosed are methods and systems that include presenting signals corresponding to a time-series of traffic on links of a network to a band-pass filter to obtain band-limited signals, the band pass filter centered substantially about a frequency corresponding to traffic to be tracked, determining coherence values of the band-limited signals, and, based on a comparison of the coherence values to a threshold, forming at least one map of the routing of the traffic based on the corresponding links.

29 Claims, 2 Drawing Sheets

METHODS AND SYSTEMS FOR TRACKING FILE ROUTING ON A NETWORK

CLAIM OF PRIORITY

This application claims priority to, and incorporates by reference, the entire disclosure of U.S. Provisional Patent Application No. 60/463,274, filed on Apr. 16, 2003. This application is co-pending with a related patent application entitled "Methods and Systems for Reducing the Spread of Files on a Network" Ser. No. 10/826,620, by the same inventor and having assignee in common, filed concurrently herewith and incorporated by reference herein in its entirety.

GOVERNMENT INTEREST

The disclosed methods and systems were developed with support from the Defense Advanced Research Projects Agency; contract number MDA972-01-C-0080. The United States Government may have certain rights in the disclosed systems and methods.

FIELD

The disclosed methods and systems relate generally to communications networks, and more particularly to methods and systems for monitoring data transmitted over such networks.

BACKGROUND

Communications networks typically include a number of interconnected communications devices. Connections among the devices in some communications networks are accomplished through physical devices such as wires or optical links. Such networks can be referred to as "wired" networks. Connections among other devices in other communications networks can be accomplished through radio, infrared, or other wireless links. Such networks can be referred to as "wireless" networks. Accordingly, networks can thus include and/or otherwise be comprised of wired and/or wireless connectors and/or networks.

In varying degrees, network users often receive unwanted communications messages. While some unwanted messages can be benign, e.g., advertisements, the amount of unwanted traffic can consume valuable resources. Additionally, some unwanted messages, e.g., computer worms and viruses, can maliciously destroy other data at a receiving node and/or disable the operation of the node, while causing the node to forward the unwanted message to further unsuspecting nodes. Methods are known in the art for identifying and blocking receipt of some unwanted messages, e.g., virus scanning software. Generally, such methods include analyzing the contents of such messages.

Communications messages (e.g., data packets) transmitted across communications networks can be intercepted. Intercepted messages can yield valuable information and the process of intercepting and analyzing messages can be referred to as "traffic analysis". In general, traffic analysis can seek to understand something about the message traffic on a network by observing the traffic and analyzing that traffic to extract information. However, to guard against unwanted traffic analysis, messages can be encrypted. For example, both the content and the destination of a message can be obscured through encryption.

Commonly assigned U.S. patent application Ser. No. 10/212,324 entitled "Encoding Signals to Facilitate Traffic Analysis", incorporated by reference herein in its entirety, describes methods and systems that acquire information about communications among nodes in a network by intercepting pieces or "chunks" of data in the network by a tap located among the nodes in the network. Characteristic information about the intercepted chunks of data can be obtained. The characteristic information can include times of arrival of the chunks of data at the tap and identifiers of the source nodes that transmitted the chunks of data. A signal can be constructed to represent the characteristic information over time.

Commonly assigned U.S. patent application Ser. No. 10/243,489 entitled "Methods and Systems for Passive Information Discovery Using Lomb Periodogram Processing", incorporated by reference herein in its entirety, describes methods and systems for processing communications signals in a network that can obtain time of arrival information for chunks of data in the network and construct a signal to represent the time of arrival of the information. The signal can consist of data that is non-uniformly spaced. The system can process the signal using a Lomb technique to obtain periodicity information about the signal.

Commonly assigned U.S. patent application Ser. No. 10/359,995 entitled "End-To-End Route Discovery From Link Activity Traces", incorporated by reference herein in its entirety, describes methods and systems for determining shortest routes between pairs of nodes in a network that can obtain time of arrival information for chunks of data in the network and construct a network graph from the time of arrival information. The network graph can include links between pairs of nodes, with the links including time series of data. The methods and systems can also include finding shortest routes between pairs of nodes in the network graph. One shortest route can be chosen for a pair of nodes that can have multiple shortest routes of the same length based on the time series of data in the links.

The information obtained using the above described methods and systems can be based on the time of arrival for chunks of data and not on the contents of the data. Thus, the information can be available for encrypted messages. Methods and systems can be developed to aid in identifying unwanted messages using this information and further to track the spread of the messages on the network.

SUMMARY

The disclosed methods and systems include tracking routing of traffic on a network by presenting signals corresponding to a time-series of traffic on links of the network through a band-pass filter to obtain band-limited signals, the band pass filter centered substantially about a frequency corresponding to traffic to be tracked. The methods and systems can also include determining coherence values of the band-limited signals, where the coherence values correspond to ingress and egress pairs of links at nodes of the network; and, based on a comparison of the coherence values to a threshold, forming at least one map of the routing of the traffic to be tracked for corresponding pairs of links.

In some embodiments, the time-series associated with the ingress and egress links at the network nodes can be windowed. The signals corresponding to the time-series of the links over a window can be passed through a band-pass filter centered on a given or determined traffic frequency emanating from code executing on the network, e.g., a frequency suspected to be generated by traffic emanating from a worm on the network. The normalized coherence for ingress-egress pairs can be computed. Higher coherence for a pair can signify increased likelihood that traffic corresponding to the frequency was routed through the pair. Determining coherence over a range of windows and across all nodes in the network can provide a map or graph indicating the routing of traffic corresponding to the frequency.

In one embodiment, a method of tracking routing of traffic on a network can include passing signals corresponding to a time-series of traffic on links of the network through a band-pass filter centered around a frequency corresponding to traffic to be tracked so as to obtain band-limited signals, determining coherence values of the band-limited signals corresponding to ingress and egress pairs of links at nodes of the network, and forming maps of the routing of the traffic to be tracked for pairs of links having coherence values above a threshold value.

The method can include tracking times of arrival data and transforming the times of arrival data into the time-series of traffic. The method can include configuring the frequency based on virus protection data. The method can include obtaining spectral analyses of the time-series, for each pair of sending node and receiving node, marking transmissions of data packets for the pair as marked transmissions when the spectral analyses indicate peak frequencies associated with the marked transmissions are different from peak frequencies associated with others of the transmissions for the pair over a window of the time-series of a predetermined duration, determining the frequency based on a frequency associated with at least two of the marked transmissions when the two marked transmissions have at least one common sending node or a common receiving node, and are within a specified number of the windows of each other. The method can include isolating nodes having coherence values above a predetermined value, or isolating a predetermined number of nodes having coherence values greater than other nodes not isolated.

The method can include parsing the time-series into windows, obtaining Lomb periodograms for the windows, comparing peak frequencies in successive ones of the periodograms for a sender node to determine if one of the periodograms includes a peak above a threshold at a first frequency different from said peak frequencies in a preceding one of the periodograms, determining if at least one peak above the threshold at the first frequency occurs in one of a predetermined number of previous periodograms for the sender node, determining if the at least one peak at the first frequency occurs in at least one of a specified number of periodograms obtained at a receiver node for other sender nodes of the network, using the first frequency to center the band-pass filter when the at least one peak at the first frequency does not occur in one of the predetermined number of previous periodograms for the sender node and when the at least one peak at the first frequency occurs in at least one of the specified number of periodograms obtained at the receiver node for other sender nodes of the network.

In one embodiment, a method of determining routing of traffic on links between nodes of a network can include obtaining time-series of the traffic, determining, based on the time-series, a tracking frequency corresponding to traffic to be tracked, passing signals corresponding to the time-series through a band-pass filter centered around the tracking frequency to obtain band-limited signals, determining coherence values of the band-limited signals corresponding to ingress and egress pairs of links at nodes of the network, and forming maps of the routing of the tracked traffic for pairs of links having coherence values above a threshold value.

In determining the tracking frequency, the method can include parsing the time-series into windows, obtaining Lomb periodograms for the windows, comparing peak frequencies in successive ones of the periodograms for a sender node to determine if one of the periodograms includes a peak above a threshold at a first frequency different from the frequencies in a preceding one of the periodograms, determining if at least one peak above the threshold at the first frequency occurs in one of a predetermined number of previous periodograms for the sender node, determining if the at least one peak at the first frequency occurs in at least one of a specified number of periodograms obtained at a receiver node for other sender nodes of the network, and using the first frequency as the tracking frequency when the at least one peak at the first frequency does not occur in one of the predetermined number of previous periodograms for the sender node and when the at least one peak at the first frequency occurs in at least one of the specified number of periodograms obtained at the receiver node for other sender nodes of the network. The method can include isolating nodes having coherence values above a predetermined value, or isolating a predetermined number of nodes having coherence values greater than other nodes not isolated.

In one embodiment, computer-readable medium can contain instructions for controlling a processor to track routing of traffic on a network by passing signals corresponding to a time-series of traffic on links of the network through a band-pass filter centered around a frequency corresponding to traffic to be tracked to obtain band-limited signals, by determining coherence values of the band-limited signals corresponding to ingress and egress pairs of links at nodes of the network, and by forming at least one map of the routing of the traffic to be tracked for pairs of links having coherence values above a threshold value. The computer-readable medium can include instructions for controlling a processor to track routing of traffic on a network by tracking times of arrival data, and by transforming the times of arrival data into the time-series of traffic. The computer-readable medium can include instructions for controlling a processor to track routing of traffic on a network by configuring the frequency based on virus protection data.

The computer-readable medium can include instructions for controlling a processor to track routing of traffic on a network by obtaining spectral analyses of the time-series, by, for each pair of sending node and receiving node, marking transmissions of data packets for the pair as marked transmissions when the spectral analyses indicate peak frequencies associated with the marked transmissions are different from peak frequencies associated with others of the transmissions for the pair over a window of the time-series of a predetermined duration, and by determining the frequency based on a frequency associated with at least two of the marked transmissions when the at least two marked transmissions have at least one common sending node or receiving node, and are within a specified number of the windows.

The computer-readable medium can include instructions for controlling a processor to track routing of traffic on a network by parsing the time-series into windows, obtaining Lomb periodograms for the windows, comparing peak frequencies in successive ones of the periodograms for a sender node to determine if one of the periodograms includes a peak above a threshold at a first frequency different from the peak frequencies in a preceding one of the periodograms, by determining if at least one peak above the threshold at the first frequency occurs in one of a predetermined number of previous periodograms for the sender node, by determining if the at least one peak at the first frequency occurs in at least one of a specified number of periodograms obtained at a receiver node for other sender nodes of the network, and by using the first frequency to center the band-pass filter when the at least one peak at the first frequency does not occur in one of the predetermined number of previous periodograms for the sender node and when the at least one peak at the first frequency occurs in at least one of the specified number of periodograms obtained at the receiver node for other sender nodes of the network.

The computer-readable medium can include instructions for controlling a processor to isolate nodes having coherence values above a predetermined value, or to isolate a predetermined number of nodes having coherence values greater than other nodes not isolated. The computer-readable medium can include instructions for controlling a processor to track routing of traffic on a network by configuring the frequency based on virus protection data.

In one embodiment, a system for tracking routing of traffic on a network can include means for passing signals corresponding to a time-series of traffic on links of the network through a band-pass filter centered around a frequency corresponding to traffic to be tracked to obtain band-limited signals, means for determining coherence values of said band-limited signals corresponding to ingress and egress pairs of links at nodes of the network, and means for forming at least one map of the routing of said traffic to be tracked for pairs of links having coherence values above a threshold value. The system can include means for configuring the frequency based on virus protection data. The system can include means for isolating nodes of the network based on at least one of having coherence values above a predetermined value and being one of a predetermined number of nodes having coherence values greater than other nodes not isolated.

In one embodiment, a computer program, disposed on a computer readable medium, can enable tracking of traffic routing on a network. The computer program can include instructions for causing a processor to obtain time-series of the traffic, to determine, based on the time-series, a tracking frequency corresponding to traffic to be tracked, to pass signals corresponding to the time-series through a band-pass filter centered around the tracking frequency to obtain band-limited signals, to determine coherence values of the band-limited signals corresponding to ingress and egress pairs of links at nodes of the network, and to form at least one map of the routing of the traffic to be tracked for pairs of links having coherence values above a threshold value.

The computer program can include instructions for causing a processor to parse the time-series into windows, to obtain Lomb periodograms for the windows, to compare peak frequencies in successive ones of the periodograms for a sender node to determine if one of the periodograms includes a peak above a threshold at a first frequency different from the peak frequencies in a preceding one of the periodograms, to determine if at least one peak above the threshold at the first frequency occurs in one of a predetermined number of previous periodograms for the sender node, to determine if the at least one peak at the first frequency occurs in at least one of a specified number of periodograms obtained at a receiver node for other sender nodes of the network, and to use the first frequency as the tracking frequency when the at least one peak at the first frequency does not occur in one of the predetermined number of previous periodograms for the sender node and when the at least one peak at the first frequency occurs in at least one of the specified number of periodograms obtained at the receiver node for other sender nodes of the network. The computer program can include instructions for causing a processor to isolate nodes having coherence values above a predetermined value, or to isolate a predetermined number of nodes having coherence values greater than other nodes not isolated.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
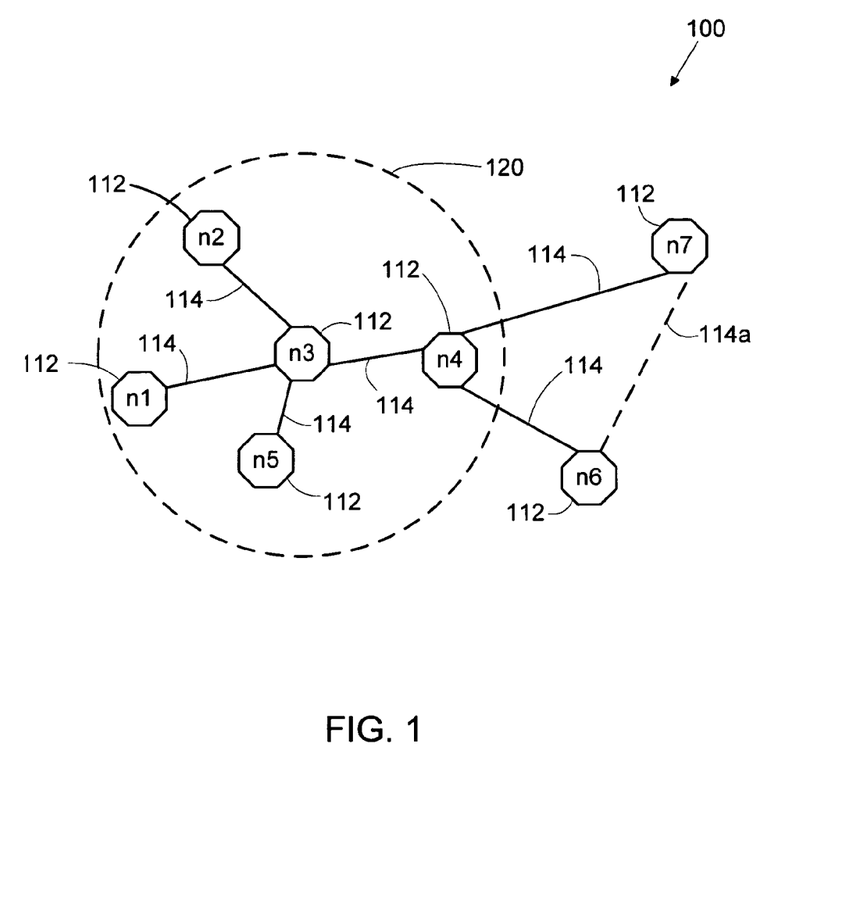
FIG. 1 illustrates a block diagram of an exemplary communications network and tap.

Referring to FIG. 1, there is shown an exemplary network 100. The network 100 can include a number of network nodes 112 connected by a number of network links 114. The network 100 can also include one or more network nodes that serve as routers. For the exemplary embodiment of FIG. 1, network 100 can include seven nodes 112 connected in a particular configuration, with nodes n3-n6 serving as routers. The illustrated configuration can be understood to be exemplary, and other configurations can be contemplated that can include varying numbers and configurations of nodes 112, links 114, and/or routers.

Network nodes 112 can be configured to send and/or receive information according to a communications protocol, such as TCP/IP. Although not specifically shown, some nodes 112 can be configured to provide a route for information to a specified destination. Other nodes 112 can be configured to send the information according to a previously-determined route. The network nodes 112 can communicate via discrete "chunks" of data that can be transmitted by "senders" 112. The chunks can include separate pieces of data and/or data elements that extend over a period of time. A chunk can be individually detectable or distinguishable. For example, router nodes n3-n6 can determine when a chunk starts and/or ends. A chunk of data need not exactly correspond to a packet of data. A chunk may represent part of a packet (e.g., a fragment or an Asynchronous Transfer Mode (ATM) cell of certain protocol description units), or multiple packets (e.g., two packets concatenated).

A sender node 112 can be understood herein to be the most recent node 112 to transmit a particular chunk. As an example, node n1 of FIG. 1 can originate a chunk and forward the chunk to node n4 of FIG. 1 via router node n3 of FIG. 1. For the exemplary configuration of FIG. 1, router node n3 can intercept the chunk as it is transmitted from mode n1 to node n4. Thus, node n1 and/or n3 can be considered a sender node.

Network links 114 can include electronic links (e.g., wires or coaxial cables), optical links (e.g., fiber optic cables), and/or wireless links. In a wired network 100, the links 114 can provide a connection between two nodes 112 (e.g., nodes n1 and n3). Router nodes, e.g., node n3, can be a part of the links 114 and can observe the information carried on them. Routers n3-n6 can include devices that can intercept chunk transmissions on the network 100 at a physical layer, a link layer, a network layer, or at higher layers of the network 100 being monitored. For example, router n3 can include a physical connection to a corresponding link 114 between nodes n1 and n4 and circuitry to detect chunks of data on the link 114. The layer at which interceptions occur can be determined by those skilled in the art, and can be chosen based on knowledge of, and access to, the network links 114.

The router nodes can include, for example, a transceiver for sensing the chunks of data and can also include other circuitry (e.g., clock circuitry) for determining times of arrival and/or duration of the chunks. The router nodes can include a processor for computing other information associated with the chunks, such as information contained within a header of the chunk of data (e.g., the identity of a sending node 112 and/or a receiving node 112).

In the example of FIG. 1, router node n3 can observe traffic on the link 114 between nodes n1, n2, n4 and n5. Router node n3 can record information about the chunks that it observes in a "tracefile." A tracefile can contain information for observed chunks, and accordingly, can be understood to be an associated grouping of such data, where such data can be associated and/or grouped using a variety of mechanisms and/or schemes. For example, the information can include the time a chunk is/was observed and the identity of the sender node(s) 112 of the chunk. The identity of the sender node(s) 112 can include, for example, the exchange point address of an Internet Protocol security (IPsec) gateway, the upstream or downstream transmitter on the point-to-point link 114, or information such as "the same sender node 112 as the one that also transmitted [specified other] chunks." If available, the tracefile can also include additional information about the length or duration of the chunk, the destination node 112, or information concerning the contents of a chunk. In addition, available information can include the location of a router node along the link 114 relative to the nodes 112 at either end of the link 114, e.g., nodes n1 and n4.

It can be understood that errors can occur in the information observed by router nodes n3-n6. For example, router node n3 can mistakenly believe it has seen a chunk when no chunk was transmitted due to bit errors on network 100. Such error events, including the false transmission detection of the previous example, or missed transmissions, or misclassification of a sender node 112, can be viewed as adding noise to the signals generated by the router nodes n3-n6. Other sources of noise in the signal generated by the router nodes n3-n6 can include interference from other signals (e.g., packets belonging to another flow, or jitter in timing due to sharing of a bottleneck among multiple flows).

Router nodes n3-n6 can listen passively and not participate in the monitored network 100 at the Media Access Control (MAC) (or higher) layers. Such passive listening can be referred to as covert information collection. In some cases, for example with 802.3, or 802.1 lb Local Area Networks (LANs), the router nodes n3-n6 can snoop at the MAC layer and extract some information about higher layer protocols. In other networks, such as Synchronous Optical Networks (SO-NET), the information about the MAC or higher layer protocols can be limited, or unavailable.

Although FIG. 1 illustrates multiple router nodes, network 100 can include one or more router nodes, which can be interconnected. Router nodes can work independently using purely local information. Distributed algorithms and/or processing schemes can allow sharing of information among router nodes. In such a case, the router nodes can have a globally synchronized clock that allows information from multiple router nodes to be combined. A clock resolution of the router nodes n3-n6 can be finer than the data sampling resolution of the router nodes n3-n6, so that information about transmissions (e.g., the start time, duration, inter-transmission gap, and even the presence of short transmissions) can be obtained without missing some of the information.

In addition, a router node (or a network of router nodes) can store the detected transmissions for an amount of time such that information concerning longer duration events can be obtained. For example, to determine the round-trip time of a transport layer flow, the history stored at router node n3 can be equal to or greater than one roundtrip time. The total volume of data stored can depend on the capacity of the links 114 to the router node n3 and a maximum roundtrip time of flows seen on the links 114. Router nodes n3-n6 can assign a unique identifier to each sender node 112. For example, the identifier can be based on the address of the IPsec gateway, though other identifiers can be assigned by router' nodes n3-n6.

It can be understood that network 100 can include a wireless network. In a wireless network 100, nodes 112 can communicate via wireless transmission, including point-to-point, broadcast, and/or other known wireless transmission methodologies. Sender nodes 112 can transmit using various types of wireless physical layers, such as terrestrial Radio Frequency (RF), satellite bands, and/or free space optical. In a wireless network, nodes 112 can include radio routers and/or client radios. The links 114 of FIG. 1 can represent wireless links at a point in time, and it can be understood that wireless links 114 can be reconfigured as the various nodes 112 communicate with other nodes 112. For example, FIG. 1 illustrates a link 114 between node n4 and node n6. At another point in time, the communications between node n4 and node n6 can be completed and node n6 can establish a communication with node n7, as illustrated by dashed line 114a.

In such a network, router nodes can include wireless router nodes that can intercept wireless transmissions on the network 100. Wireless router nodes can observe some (potentially very large) fraction of the wireless spectrum, and thus can observe transmissions from a wide range of wireless sender nodes 112. As illustrated by dashed line 120 shown in FIG. 1, wireless router nodes can have a limited effective reception range. Dashed line 120 can indicate an effective reception area through which router node n3 can receive communications from the nodes 112. Some nodes 112, such as nodes n6 and n7 in FIG. 1, can be out of the effective reception area and will not be monitored by router node n3. Nodes n1-n5, which can be within the range illustrated by dashed line 120, can be monitored by router node n3.

For wireless nodes 112, node identity information observed by the router nodes can include, for example, an RF signature and/or the location of a radio transmitter node 112. For a wireless router node, e.g., n3, additional information can include the geographic location of the router node n3, as determined by, for example, a global positioning system (GPS) receiver. As previously described, although FIG. 1 illustrates multiple router nodes n3-n6, network 100 can include one or more router nodes. For a wireless network, the number of router nodes placed in the network 100 can be determined by the desired coverage level of network 100. Wireless router nodes can have a globally synchronized clock that allows information from multiple router nodes to be combined.

In the presence of mobile nodes 112, e.g., in ad hoc wireless networks or Mobile IP, router nodes can include mobile router nodes, though stationary nodes can be utilized. Wireless router nodes can be placed randomly over a specified geographic area, or can be placed in a predetermined pattern. Alternately, wireless router nodes can be placed near respective sender nodes 112. Sender nodes 112 can move into or out of range of one or more wireless router nodes. Sender nodes 112 typically can dwell in the range of one or more router nodes long enough for transmission to be observed and the sources identified and recorded. For wireless sender nodes 112, the unique identifier can be based on the RF signature of the wireless sender node 112.

Figure 2:
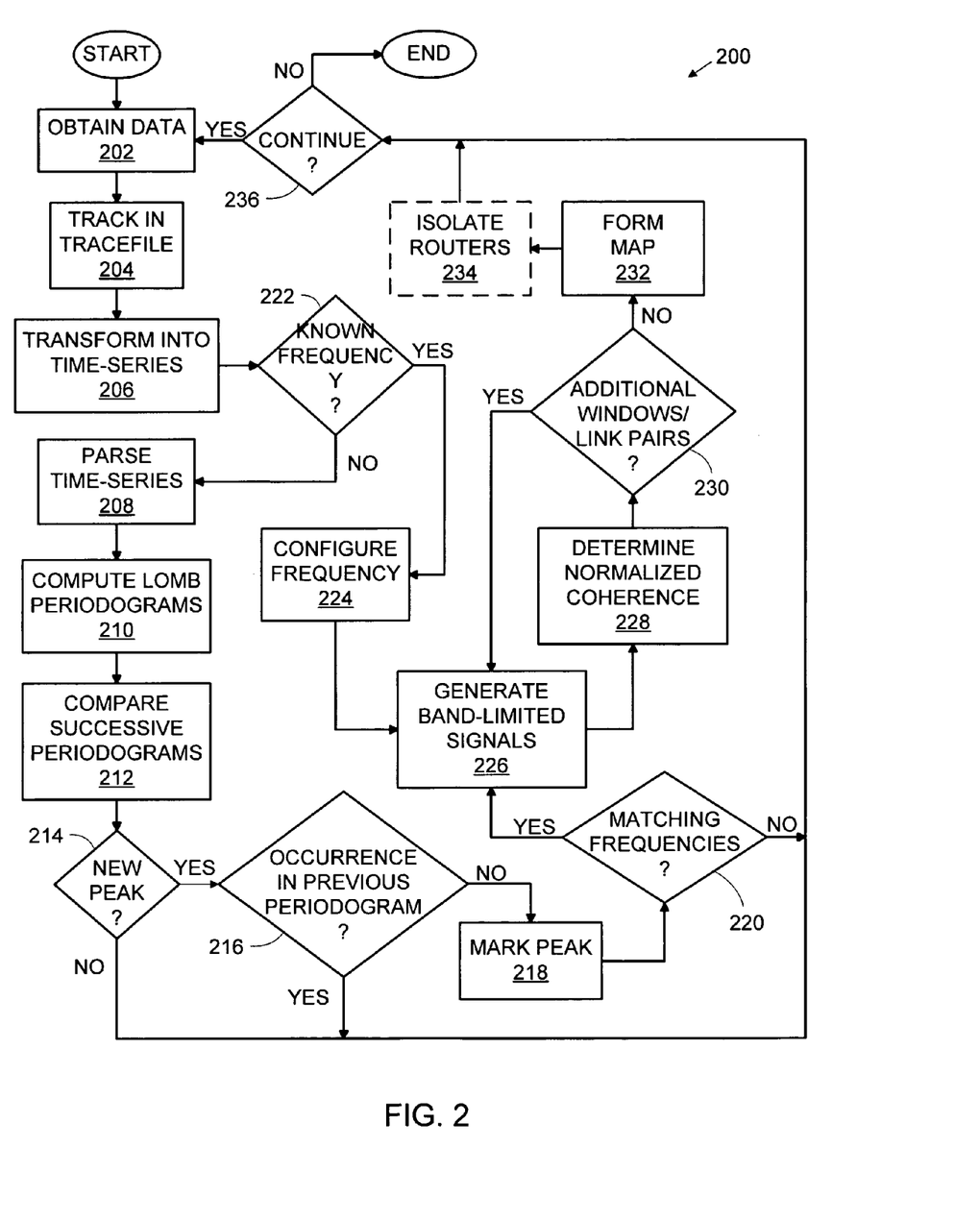
FIG. 2 illustrates a flow diagram of a method of identifying information routed on a network and tracking the routing of the identified information on the network.

Referring to FIG. 2, there is a flow chart of a method 200 that can track routing of traffic on a network, such as network 100 of FIG. 1. The method 200 can include identifying traffic frequency emanating from code and/or processor instructions executing on a network. The method can begin 202 by obtaining traffic flow data for the network 100 at one or more router nodes, as shown at nodes n3-n6 in FIG. 1. It can be understood that other known means of obtaining traffic flow data can be used and the implementation of method 200 need not be restricted to the use of router nodes n3-n6. For example, one or more taps can be provided that can determine when a chunk starts and ends. Such taps can include physical connections to corresponding links 114 and circuitry to detect chunks of data on the links 114. As in the case of router nodes n3-n6, the taps can include transceivers for sensing the chunks of data and can also include other circuitry (e.g., clock circuitry) for determining times of arrival and duration of the chunks. The taps can include processors for computing other information associated with the chunks, such as information contained within a header of the chunk of data.

Using the traffic flow data, method 200 can track (204), e.g., in a number of tracefiles, the time of arrival of packets at a router, or node 112, from the various sender nodes 112 seen by the router, with a sender node 112 having a corresponding tracefile. The tracefiles can be transformed (206) into a time-series. Those of skill in the art can appreciate that numerous methods can be employed to obtain a time-series from data, such as the traffic flow data in the above mentioned tracefile, including those described in detail in referenced U.S. patent application Ser. No. 10/212,324. In one embodiment for representing the time of arrival of chunks, a time quantization can be chosen, time can be "binned" and/or separated/grouped into time increments and/or intervals at that quantization and a marker can be placed in the bins that contain a detected chunk. A non-uniform signal can be represented as a non-uniformly-spaced sequence of impulses. The impulses can indicate leading edges of the discrete events in the tracefile for a router node, such as node n3 in FIG. 1.

In tracking file routing where the ingress-egress frequencies of the data stream are not known, e.g., in tracking worms that may enter the network, the time-series from 206 can be parsed (208) into discrete processing time windows and/or intervals of a predetermined duration, and/or size. The window size can depend on the characteristics of the network 100 and can be chosen to ensure that a window can include sufficient data for processing. As an example, a window size can be taken as twice a round-trip time via a satellite link, 2*300 ms=600 ms. If a router node is on a 1 Gigabit/second link, the window size translates to 600 Megabits of memory for the window. Method 200 can compute 210 the Lomb Periodogram for a given window and/or source, and/or sender node 112. As known in the art, the Lomb technique provides a spectral analysis technique specifically designed for non-uniformly sampled data. Inherently, packet arrival times in computer networks, such as network 100 can be unevenly spaced, resulting in a non-uniformly sampled natural signal encoding. As described in further detail in referenced U.S. patent application Ser. No. 10/243,489, the Lomb technique can compute a periodogram by evaluating data only at the times for which a measurement is available.

Successive periodograms for the same source, or sender node 112, can be compared (212) with one another. Generally, the comparison can include obtaining a predetermined number (x) of strongest peaks of a periodogram, e.g., 10-100 peaks, and comparing them to the x strongest peaks of the previous periodogram. If a new peak is identified above a predetermined threshold, as determined at 214, it can be determined 216 if the identified peak occurred in one of a predetermined number of previous periodograms for the sender node. Generally, the number of previous periodograms can be chosen to provide an extended timeframe, e.g., in the range of seconds, during which the router can have experienced a full range of data types. As an example, the number of timeframes can depend on a network operator's requirements for false positives, with fewer false positives requiring the use of more timeframes. In one example, two timeframes can be used. In another example, the number of timeframes can be equal to the total available memory of the router node divided by the window size as described above.

If the identified peak has not occurred in one of the number of previous periodograms, the identified peak can be marked (218) for further analysis. If one or more marked peaks from other sender nodes 112, or from other routers in the network neighborhood have matching frequencies within nearby windows, as determined at 220, the matching frequency can be used to track the routing of the associated code on the network. Generally, a nearby window can be the two or three windows, or timeframes, previous to the window in which a marked peak was identified, though other numbers of windows can be contemplated. It can be understood that other methods can be used for identifying and/or obtaining the frequency for traffic to be tracked, including historical data traffic analysis and/or network simulations. Optionally, the frequency can be known, as determined at 222, such that the frequency can be configured 224, such as by a system administrator, or other system operator or person having configuration authority. In one embodiment, the frequencies for traffic to be tracked can be known based on virus protection data, such as data provided through anti-virus alerting services and/or programs.

A band-limited signal can be generated 226 from the time-series determined at 206 by passing and/or presenting the signal corresponding to the time-series to and/or through a band-pass filter centered substantially about the frequency from 220 or 224. As is known, such a signal can capture the effect of the frequency from 220 or 224, though other frequencies may have more power in the band. As also known in the art, one can window the time-series to improve computational efficiency for passing the signal through the band-pass filter. In one embodiment, the band-pass filter windows can correspond with the periodogram windows. In one embodiment, the windows can be in a range of 500 ms. It can be understood that the periodogram and band-pass filter windows can be different and that different ranges of windows can be used.

A coherence, including for example, a normalized coherence, of and/or between the band-limited signals corresponding to ingress and egress pairs of the routers can be determined 228. Those of skill in the art can appreciate that numerous methods can be employed to obtain coherence, including those described in detail in referenced U.S. patent application Ser. No. 10/359,995. As described therein, one measure of link coherence can include the cross spectral density of the link signals, whose value can be mapped between 0 and 1. The coherence determined at 228 can be indicative of the path through the network 100 taken by the chunks corresponding to the frequency determined at 220, or configured at 224. A coherence value close to 1.0 can indicate a high probability that the chunks came into and went out of the associated router through the corresponding ingress and egress link pair.

In the disclosed methods and systems, it can be determined if additional windows and/or ingress-egress pairs can be processed (230), and if so, a band-limited signal can be generated 226 for the next window if additional windows remain to be processed, for the next ingress-egress link pair, if additional link pairs remain to be processed. When no additional windows or link pairs remain, a map or graph for the routing of the code generated traffic can be formed from the ingress and egress link pairs having coherence values above a predetermined threshold 232. The map or maps can be based on one or more windows, with successive maps indicating the spread of the code generated traffic through the network over time. The threshold can be configurable, with higher thresholds implying smaller numbers of false positives, but with higher numbers of missed detection. A lower coherence threshold can imply a higher number of false-positives, but fewer missed detections. The numbers of false positives and missed detections can also depend on the speed at which the file being tracked spreads through network 100 and on the number of nodes over which it spreads.

In one embodiment, the code generated traffic can be associated with unwanted communications. For example, a worm or virus can disrupt router node and/or network operations and can be spread through a network, such as network 100. The map generated at 232 can be useful in determining which routers or nodes to isolate from the network to prevent further spread of the worm or virus. In one embodiment, a number of nodes having the highest coherence values can be isolated or quarantined, as indicated in phantom at 234. The number of nodes to be quarantined can be predetermined or the nodes to be quarantined can be selected based on the map.

Accordingly, the disclosed methods and system can provide for a continuous monitoring function that can obtain traffic flow data while the network is operable or active. Thus, for the FIG. 2 example embodiment, such method 200 can return to obtain additional data at 202 until monitoring is no longer desired, as determined at 236. Additionally, the FIG. 2 embodiment 200 can return to obtain data at 202 via 236, if no new peaks are determined at 214, or if the new peaks have occurred in previous periodograms, as determined at 216, or if no peaks with matching frequencies are determined at 220.

In addition, the techniques described herein can be implemented in hardware or software, or a combination thereof. The systems and methods can be implemented in one or more computer programs executing on one or more programmable computers, such as may be exemplified by nodes 112, among others, that include a processor, a storage medium readable by the processor (including volatile and/or non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. By way of example only, the computer program(s) can be preferably stored on a computer readable medium, storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A processor-implemented method of tracking routing of traffic on a network, comprising:
    tracking times of arrival data;
    transforming said times of arrival into time-series;
    determining a frequency corresponding to traffic to be tracked, wherein determining the frequency comprises:
    parsing said time-series into windows,
    obtaining Lomb periodograms for said windows,
    comparing peak frequencies in successive ones of said periodograms for a sender node to determine if one of said periodograms includes a peak above a threshold at a first frequency different from said peak frequencies in a preceding one of said periodograms,
    determining if at least one peak above said threshold at said first frequency occurs in one of a predetermined number of previous periodograms for said sender node, determining if said at least one peak at said first frequency occurs in at least one of a specified number of periodograms obtained at a receiver node for other sender nodes of said network,
    using said first frequency to position a band-pass filter when said at least one peak at said first frequency does not occur in one of said predetermined number of previous periodograms for said sender node and when said at least one peak at said first frequency occurs in at least one of said specified number of periodograms obtained at said receiver node for other sender nodes of said network;

presenting spatially separated signals corresponding to the time-series of traffic on spatially separated links of said network to the band-pass filter to obtain spatially separated band-limited signals, the band pass filter centered substantially about the determined frequency;

determining by a processor coherence values of said spatially separated band-limited signals, each coherence value corresponding to at least two spatially separated links in said network; and based on a comparison of said coherence values of said spatially separated band-limited signals to a threshold forming at least one map of said routing of said traffic based on the corresponding spatially separated links.

2. The method of claim 1, further comprising configuring said frequency based on virus protection data.

3. The method of claim 1, where a spatially separated link includes at least one sending node and a receiving node, further comprising:

obtaining spectral analyses of said time-series;

for each spatially separated link, marking transmissions of data packets for said spatially separated link as marked transmissions when said spectral analyses indicate peak frequencies associated with said marked transmissions are different from peak frequencies associated with others of said transmissions for said spatially separated link over a window of said time-series of a predetermined duration; and determining said frequency based on a frequency associated with at least two of said marked transmissions when said at least two marked transmissions have at least one of a common sending node and a common receiving node, and are within a specified number of said windows.

4. The method of claim 1, further comprising isolating nodes having coherence values above a predetermined value.

5. The method of claim 1, further comprising isolating a predetermined number of nodes having coherence values greater than other nodes not isolated.

6. The method of claim 1, further comprising configuring said frequency based on virus protection data.

7. The method of claim 6, further comprising isolating nodes having coherence values above a predetermined value.

8. The method of claim 6, further comprising isolating a predetermined number of nodes having coherence values greater than other nodes not isolated.

9. A processor-implemented method of determining routing of traffic on spatially separated links between nodes of a network, comprising:

obtaining time-series of said traffic;

determining, based on said time-series, a tracking frequency corresponding to traffic to be tracked, wherein determining said tracking frequency comprises:

parsing said time-series into windows, obtaining Lomb periodograms for said windows, comparing peak frequencies in successive ones of said periodograms for a sender node to determine if one of said periodograms includes a peak above a threshold at a first frequency different from said peak frequencies in a preceding one of said periodograms, determining if at least one peak above said threshold at said first frequency occurs in one of a predetermined number of previous periodograms for said sender node, determining if said at least one peak at said first frequency occurs in at least one of a specified number of periodograms obtained at a receiver node for other sender nodes of said network, using said first frequency to position a band-pass filter when said at least one peak at said first frequency does not occur in one of said predetermined number of previous periodograms for said sender node and when said at least one peak at said first frequency occurs in at least one of said specified number of periodograms obtained at said receiver node for other sender nodes of said network;

passing spatially separated signals corresponding to said time-series through the band-pass filter centered around said tracking frequency to obtain spatially separated band-limited signals;

determining by a processor coherence values of said spatially separated band-limited signals, each coherence value corresponding to an ingress and egress pair of spatially separated links at nodes of said network; and forming at least one map of said routing of said traffic to be tracked for pairs of said spatially separated links having coherence values of said spatially separated band-limited signals above a threshold value.

10. The method of claim 9, further comprising isolating nodes having coherence values above a predetermined value.

11. The method of claim 9, further comprising isolating a predetermined number of nodes having coherence values greater than other nodes not isolated.

12. A non-transitory computer-readable medium containing instructions for controlling a processor to track routing of traffic on a network by:

tracking times of arrival data;

transforming said times of arrival data into said time-series;

determining a frequency corresponding to traffic to be tracked, wherein determining the frequency comprises:

parsing said time-series into windows, obtaining Lomb periodograms for said windows, comparing peak frequencies in successive ones of said periodograms for a sender node to determine if one of said periodograms includes a peak above a threshold at a first frequency different from said peak frequencies in a preceding one of said periodograms, determining if at least one peak above said threshold at said first frequency occurs in one of a predetermined number of previous periodograms for said sender node, determining if said at least one peak at said first frequency occurs in at least one of a specified number of periodograms obtained at a receiver node for other sender nodes of said network, using said first frequency to position a band-pass filter when said at least one peak at said first frequency does not occur in one of said predetermined number of previous periodograms for said sender node and when said at least one peak at said first frequency occurs in at least one of said specified number of periodograms obtained at said receiver node for other sender nodes of said network;

passing spatially separated signals corresponding to the time-series of traffic on spatially separated links of said network through the band-pass filter centered around the determined frequency to obtain spatially separated band-limited signals;

determining coherence values of spatially separated said band-limited signals, each coherence value corresponding to an ingress and egress pair of spatially separated links at nodes of said network; and forming at least one map of said routing of said traffic to be tracked for pairs of spatially separated links, having coherence values of said spatially separated band-limited signals above a threshold value.

13. The computer-readable medium of claim 12, further comprising instructions for controlling a processor to track routing of traffic on a network by configuring said frequency based on virus protection data.

14. The computer-readable medium of claim 12, further comprising instructions for controlling a processor to track routing of traffic on a network by:
   obtaining spectral analyses of said time-series;
   for each pair of sending node and receiving node, marking transmissions of data packets for said pair as marked transmissions when said spectral analyses indicate peak frequencies associated with said marked transmissions are different from peak frequencies associated with others of said transmissions for said pair over a window of said time-series of a predetermined duration; and
   determining said frequency based on a frequency associated with at least two of said marked transmissions when said at least two marked transmissions have at least one of a common sending node and a common receiving node, and are within a specified number of said windows.

15. The computer-readable medium of claim 12, further comprising instructions for controlling a processor to isolate nodes having coherence values above a predetermined value.

16. The computer-readable medium of claim 12, further comprising instructions for controlling a processor to isolate a predetermined number of nodes having coherence values greater than other nodes not isolated.

17. The computer-readable medium of claim 12, further comprising instructions for controlling a processor to track routing of traffic on a network by configuring said frequency based on virus protection data.

18. The computer-readable medium of claim 17, further comprising instructions for controlling a processor to isolate nodes having coherence values above a predetermined value.

19. The computer-readable medium of claim 17, further comprising instructions for controlling a processor to isolate a predetermined number of nodes having coherence values greater than other nodes not isolated.

20. A processor-implemented method for tracking routing of traffic on a network, comprising:
   tracking times of arrival data;
   transforming said times of arrival into time-series;
   determining a frequency corresponding to traffic to be tracked, wherein determining the frequency comprises:
   parsing said time-series into windows,
   obtaining Lomb periodograms for said windows,
   comparing peak frequencies in successive ones of said periodograms for a sender node to determine if one of said periodograms includes a peak above a threshold at a first frequency different from said peak frequencies in a preceding one of said periodograms,
   determining if at least one peak above said threshold at said first frequency occurs in one of a predetermined number of previous periodograms for said sender node, determining if said at least one peak at said first frequency occurs in at least one of a specified number of periodograms obtained at a receiver node for other sender nodes of said network,
   using said first frequency to position a band-pass filter when said at least one peak at said first frequency does not occur in one of said predetermined number of previous periodograms for said sender node and when said at least one peak at said first frequency occurs in at least one of said specified number of periodograms obtained at said receiver node for other sender nodes of said network;
   passing spatially separated signals corresponding to the time-series of traffic on spatially separated links of said network through the band-pass filter centered around the determined frequency to obtain spatially separated band-limited signals;
   determining by a processor coherence values of said spatially separated band-limited signals, each coherence value corresponding to an ingress and egress pair of spatially separated links at nodes of said network; and
   forming at least one map of said routing of said traffic to be tracked for pairs of spatially separated links having coherence values of said spatially separated band-limited signals above a threshold value.

21. The method of claim 20, further comprising configuring said frequency based on virus protection data.

22. The method of claim 20, further comprising isolating nodes of said network based on at least one of having coherence values above a predetermined value and being one of a predetermined number of said nodes having coherence values greater than other nodes not isolated.

23. A non-transitory computer readable medium storing processor issuable instructions for enabling tracking of traffic routing on a network, said computer program including instructions for causing a processor to:
   obtain time-series of said traffic;
   determine, based on said time-series, a tracking frequency corresponding to traffic to be tracked, wherein determining said tracking frequency comprises:
   parsing said time-series into windows,
   obtaining Lomb periodograms for said windows,
   comparing peak frequencies in successive ones of said periodograms for a sender node to determine if one of said periodograms includes a peak above a threshold at a first frequency different from said peak frequencies in a preceding one of said periodograms,
   determining if at least one peak above said threshold at said first frequency occurs in one of a predetermined number of previous periodograms for said sender node,
   determining if said at least one peak at said first frequency occurs in at least one of a specified number of periodograms obtained at a receiver node for other sender nodes of said network,
   using said first frequency to position a band-pass filter when said at least one peak at said first frequency does not occur in one of said predetermined number of previous periodograms for said sender node and when said at least one peak at said first frequency occurs in at least one of said specified number of periodograms obtained at said receiver node for other sender nodes of said network;
   pass spatially separated signals corresponding to said time-series through the band-pass filter centered around said tracking frequency to obtain spatially separated band-limited signals;
   determine coherence values of said spatially separated band-limited signals, each coherence value corresponding to an ingress and egress pair of spatially separated links at nodes of said network; and
   form at least one map of said routing of said traffic to be tracked for pairs of said spatially separated links having coherence values of said spatially separated band-limited signals above a threshold value.

24. The computer-readable medium of claim 23, further comprising instructions for causing a processor to isolate nodes having coherence values above a predetermined value.

25. The computer-readable medium of claim 23, further comprising instructions for causing a processor to isolate a predetermined number of nodes having coherence values greater than other nodes not isolated.

26. The method of claim 1, wherein coherence values further comprise cross spectral densities between said spatially separated band-limited signals.

27. The method of claim 1, wherein the comparison of said coherence values of said spatially separated band-limited signals to a threshold further comprises identifying coherence values greater than the threshold to determine said routing of said traffic to be tracked.

28. The method of claim 27, wherein identifying coherence values greater than the threshold occurs successively throughout the network to track an extended route across the network.

29. The method of claim 1, wherein the frequency corresponding to traffic to be tracked is a frequency emanating from a worm or virus.

* * * * *